United States Patent
Hargreaves

(10) Patent No.: US 9,468,288 B2
(45) Date of Patent: Oct. 18, 2016

(54) LIGHT HANGER

(71) Applicant: IP Holdings, LLC, Vancouver, WA (US)

(72) Inventor: Doug Hargreaves, Vancouver, WA (US)

(73) Assignee: IP Holdings, LLC, Vancouver, WA (US)

(*) Notice: Subject to any disclaimer, the term of this patent is extended or adjusted under 35 U.S.C. 154(b) by 0 days.

(21) Appl. No.: 14/871,811

(22) Filed: Sep. 30, 2015

(65) Prior Publication Data

US 2016/0014979 A1  Jan. 21, 2016

(51) Int. Cl.
| | |
|---|---|
| A47B 13/02 | (2006.01) |
| F16B 12/00 | (2006.01) |
| F16B 12/40 | (2006.01) |
| A47B 7/00 | (2006.01) |
| A47B 13/06 | (2006.01) |
| A47F 5/13 | (2006.01) |
| F16B 12/52 | (2006.01) |
| F16B 12/42 | (2006.01) |

(Continued)

(52) U.S. Cl.
CPC ............... *A47B 13/02* (2013.01); *A47B 13/06* (2013.01); *A47F 5/13* (2013.01); *F16B 12/42* (2013.01); *F16B 12/52* (2013.01); *A47B 13/021* (2013.01); *A47B 87/02* (2013.01); *A47B 97/00* (2013.01); *A47B 2230/16* (2013.01); *F16B 7/048* (2013.01); *F16B 12/40* (2013.01); *Y10T 29/49828* (2015.01); *Y10T 29/49895* (2015.01); *Y10T 403/1624* (2015.01)

(58) Field of Classification Search
CPC .... A47B 13/02; A47B 13/06; A47B 13/021; A47B 2230/16; A47B 87/02; F16B 12/40; F16M 1/00

USPC .......... 248/150, 151, 165, 97; 211/189, 182, 211/186, 188, 194; 108/186, 192, 156, 108/153.1; 403/171

See application file for complete search history.

(56) References Cited

U.S. PATENT DOCUMENTS

| | | | |
|---|---|---|---|
| 1,912,847 A | 6/1933 | Klepel | |
| 2,695,712 A | 11/1954 | Kolander | |

(Continued)

FOREIGN PATENT DOCUMENTS

| | | |
|---|---|---|
| AU | 628170 | 9/1992 |
| CN | 1149434 | 5/1997 |

(Continued)

OTHER PUBLICATIONS

Young, Lee W., International Search Report for PCT/US12/00001, issued May 1, 2012.

(Continued)

*Primary Examiner* — Tan Le
(74) *Attorney, Agent, or Firm* — J. Douglas Wells

(57) ABSTRACT

A modular portable light hanger that can be quickly and easily assembled and disassembled to a tray stand by one person without using any tools or hardware, each corner of the stand preferably interconnecting with a light hanger corner pole, and the four corner poles interconnecting with perimeter poles forming a substantially rectangular or square perimeter across which cross-wise equipment/light hanger poles are toolessly attached, providing cross members over the tray stand growing area from which equipment such as light fixtures, air moving fans, ducting, etc. may by suspended.

5 Claims, 10 Drawing Sheets

(51) Int. Cl.
*A47B 87/02* (2006.01)
*A47B 97/00* (2006.01)
*F16B 7/04* (2006.01)

(56) References Cited

U.S. PATENT DOCUMENTS

| | | | |
|---|---|---|---|
| 2,794,496 A | 6/1957 | Strand | |
| 3,013,670 A | 12/1961 | Mayer | |
| 3,121,496 A | 2/1964 | Brunette | |
| 3,172,376 A | 3/1965 | Havlis | |
| 3,189,363 A | 6/1965 | Pierrat | |
| 3,502,227 A | 3/1970 | Schell, Jr. | |
| 3,517,828 A * | 6/1970 | Hunter | A47B 87/0215 206/392 |
| 3,599,580 A | 8/1971 | Adair et al. | |
| 3,765,541 A | 10/1973 | Madey et al. | |
| 3,787,072 A | 1/1974 | Deboer et al. | |
| 3,919,603 A * | 11/1975 | Salvati | H02B 1/01 211/182 |
| D240,871 S | 8/1976 | Herman | |
| 3,997,139 A | 12/1976 | Young et al. | |
| 4,099,735 A | 7/1978 | Becker, III | |
| 4,179,169 A | 12/1979 | Daniels et al. | |
| D254,994 S | 5/1980 | Miereanu et al. | |
| 4,419,938 A * | 12/1983 | Kaut | A47B 47/05 108/101 |
| 4,516,376 A * | 5/1985 | King | A47B 47/0008 403/171 |
| 4,630,550 A | 12/1986 | Weitzman | |
| 4,684,087 A | 8/1987 | Spickard | |
| 4,773,547 A | 9/1988 | Bell | |
| 4,832,421 A | 5/1989 | Shoffner | |
| D304,982 S | 12/1989 | Bush et al. | |
| 4,974,526 A | 12/1990 | Wiygul, Jr. | |
| 5,016,765 A | 5/1991 | Leonardo | |
| D321,571 S | 11/1991 | Lucariello | |
| 5,257,794 A | 11/1993 | Nakamura | |
| 5,313,725 A | 5/1994 | DeVassie | |
| 5,335,605 A | 8/1994 | Drabczyk | |
| 5,370,245 A * | 12/1994 | Tersch | A47B 73/006 211/194 |
| 5,437,165 A | 8/1995 | White | |
| 5,517,928 A | 5/1996 | Erdman | |
| 5,527,103 A | 6/1996 | Pittman | |
| 5,531,464 A | 7/1996 | Maurer et al. | |
| 5,579,703 A | 12/1996 | King | |
| 5,645,331 A | 7/1997 | Eddy et al. | |
| 5,678,706 A | 10/1997 | Husak et al. | |
| 5,715,956 A | 2/1998 | Yoshida | |
| 5,813,737 A | 9/1998 | Stone | |
| 5,931,019 A | 8/1999 | White | |
| 5,941,183 A | 8/1999 | Ming-Shun | |
| 5,943,968 A | 8/1999 | Dobson et al. | |
| 5,954,412 A | 9/1999 | Rutherford et al. | |
| 6,027,000 A | 2/2000 | Sterzel et al. | |
| 6,073,320 A | 6/2000 | Salatin et al. | |
| 6,135,299 A * | 10/2000 | Burgess | A47B 46/00 211/150 |
| 6,205,738 B1 * | 3/2001 | Chen | E04C 3/28 312/265.4 |
| 6,213,333 B1 | 4/2001 | Icard | |
| 6,454,261 B2 | 9/2002 | Ohira | |
| 6,550,791 B2 | 4/2003 | Ramsey | |
| 6,581,221 B2 | 6/2003 | Rosenquist | |
| 6,651,456 B1 | 11/2003 | White | |
| 6,811,163 B1 | 11/2004 | Gurule et al. | |
| 6,902,074 B2 | 6/2005 | Albrecht | |
| 6,948,435 B1 * | 9/2005 | Sheng | A47B 47/0016 108/180 |
| 6,969,077 B2 | 11/2005 | Liu | |
| 7,055,834 B1 | 6/2006 | White et al. | |
| 7,152,749 B2 | 12/2006 | Beck | |
| 7,165,749 B2 | 1/2007 | Venezia | |
| 7,438,195 B2 * | 10/2008 | Beck | B65D 19/12 206/335 |
| 7,770,323 B2 | 8/2010 | Kim | |
| 8,714,498 B2 | 5/2014 | Ortega | |
| 9,084,478 B2 | 7/2015 | Ortega | |
| 2007/0095770 A1 | 5/2007 | Backofen | |
| 2008/0191538 A1 | 8/2008 | Berg et al. | |
| 2009/0284111 A1 | 11/2009 | Hazzard et al. | |
| 2010/0313474 A1 | 12/2010 | Williams | |
| 2012/0199707 A1 | 8/2012 | Ortega | |
| 2015/0320200 A1 | 11/2015 | Ortega | |

FOREIGN PATENT DOCUMENTS

| | | |
|---|---|---|
| CN | 101505585 | 8/2009 |
| CN | 201830709 | 5/2011 |
| WO | WO2013019268 | 2/2013 |

OTHER PUBLICATIONS

Chinese Patent Office, Translation of Chinese Office Action for CN 201280018267.2.

* cited by examiner

LIGHT HANGER

TECHNICAL FIELD OF THE INVENTION

This invention relates to the field of stands and light hangers, and specifically to stands and light hangers used for indoor gardening or aquatics that require no tools or additional hardware when assembling or disassembling. More particularly, this invention relates to light hanger means configured to assemble and disassemble without tools and to be adaptable for use with tray stands.

BACKGROUND OF THE INVENTION

The present invention relates to knock-down portable stands, such as used to support heavy items at level elevations, and light hangers for suspending equipment such as lights or air handling fans and associated ducting over a plant growing environment. The invention aims to provide a portable stand and light hanger of modular construction that easily assembles and disassembles without the need for tools and without requiring fasteners or hardware of any type.

Indoor gardeners utilize trays for starting, propagating, and growing plants. Ebb & flow or drip system gardeners often load a tray with plants, growing media, and water, which in aggregate can become too heavy for the common card table or plastic fold out table to support. Leaving the tray on the ground is not a good option as the standard placement of the water reservoir is directly below the tray. Having the tray elevated for easier plant tending is further desired to make the growing process more enjoyable for the user, and accessible for the disabled grower.

A stand used for growing plants that supports a propagation tray must maintain the tray at a level elevation to facilitate complete draining of water and nutrient solutions from the growing media and tray. As the bottom of the tray must be level to the ground in order to optimize ebb and flow gardening practice, the stand that holds the tray must be sturdy enough to prevent the tray from flexing or tilting, keeping the tray level and undistorted.

Like a stand used in propagation of plants, a stand used for fish tank support must also maintain a level elevation, and be strong enough to hold the weight of an aquarium, full of water, fish, and rock, with over head lights, pumps, and other components necessary for indoor aquatic practice located either above, below, or on the stand. As the nature of aquatics and growing plants includes the presence of water, the stand must not only be strong and rigid when assembled, but also resistant to water damage, and will not fail if occasionally soaked or saturated, which makes stands constructed of wood or wood composite materials undesirable.

A stand that is easy to assemble and disassemble, with the benefit of breaking it down simply to fit into a compact storage area is greatly desired. With the disabled user in mind, the assembly and disassembly process should be easy to understand with no small fasteners or hardware that would be difficult to secure with arthritis or joint pain. Ideally, no tools or hardware would be required.

A recent answer to the 'stand' problem presented has been products similar to the "Gorilla Tray Stand" that require fixating a plurality of small threaded fasteners to assemble or disassemble. The structure of the stand itself holds the tray level to the ground, is rigid, and allows for easy moving. However, the short comings of this tray stand is the complicated assembly instructions, difficult to fasten bolts and screws, difficult disassembly, all requiring the use of specialized tools.

Hence, it can be seen in the indoor gardening and indoor aquatics industry, especially for ebb and flow or drip gardening practices, that there is a need for an improved modular stand, capable of securing a propagation tray or fish tank such that it remains level and elevated to the ground, provides space under the tray or tank for a reservoir or the like, allows accessibility from all sides, is mobile, and easily assembled and disassembled. Further, other fields of art also benefit from a stand that is versatile in application and robust in design as described herein.

SUMMARY OF THE INVENTION

The stand and light hanger assembles easily without tools, additional hardware, or complicated instructions. In preferred modular embodiments, the stand has four frame rails with each having similar construction. At each corner there is a leg that facilitates the interlocking of the frame rails without fasteners, each able to receive a wheel or caster on the ground end. Each corner of the stand preferably interconnects with a light hanger corner pole, and the four corner poles are interconnected with perimeter poles forming a substantially rectangular or square perimeter across which cross-wise equipment/light hanger poles are toolessly attached, providing cross members over the tray stand growing area from which equipment such as light fixtures, air moving fans, ducting, etc. may by suspended. The entire stand and light hanger disassembles by pulling apart the corner poles, perimeter poles, and cross-wise equipment/light hanger poles, pulling each corner pole from an adapter interconnecting the corner pole with a corner of the tray stand, then pulling up on each side rail and removing the legs, allowing the stand to quickly break down.

The components are preferably long and tubular allowing for compact storage or easy packing for travel or transport. The stand and light hanger can support substantial weights, and with the addition of cross supports on the stand, the loading capacities of the stand can be significantly increased. The stand cross supports fixate either on the top of the frame when used as a table top, or on the bottom of the frame when used to support a fish tank or propagation tray. When used as a propagation tray stand the device provides 360 degree access to items supported on or within the stand and items located below the stand. In the disclosed embodiment described herein, the stand is of just one specific application as a mobile plant tray stand for growing plants, whereby the plant tray fittingly inserts from the top and rests on the frame and within the stand, while a reservoir is located below to facilitate ebb and flow type gardening practice. One skilled in the art will quickly realize that many other uses and applications are readily available for the stand, including but not in any way limited to a quick to assemble table, fish tank stand, marketing display, or moving dolly.

OBJECTS AND ADVANTAGES

These and other advantages and features of the present invention are described herein so as to make the present invention understandable to one of ordinary skill in the art:
1. Versatile in application
2. Robust in construction
3. Preferably only eight stand components: four frame rails and four legs; and preferably only eleven poles with four stand-to-corner pole adapters, four perimeter pole corner connectors, and six cross-wise equipment/light hanger pole connector ends for the preferably three cross-wise equipment/light hanger poles 4. Preferably only three unique stand components: base frame, side frame, and leg; or two unique stand components if base and side frames are constructed each with oppositely oriented leg dowel receivers such that each base and side frame are of identical construction 5. Optional stand cross bars easily attach sides for increasing loading capacity 6. Interlocking at the corners provides a rigid and sturdy stand 7. Rigidity and strength increase with added load 8. Movable with inclusion of wheels at the bottom of each of the four legs 9. No tools or special equipment needed to assemble/disassemble 10. Simple to understand assemble/disassemble instructions 11. Fast assembly/disassembly 12. Stores in compact spaces when disassembled 13. Easily transportable when disassembled 14. No hardware

BRIEF DESCRIPTION OF THE FIGURES

Elements in the figures have not necessarily been portrayed to scale in order to enhance their clarity and improve understanding of these various elements of just one embodiment of the invention. Furthermore, elements that are known to be common and well understood to those in the industry are not depicted in order to provide a clear view of the invention, thus the drawings are generalized in form in the interest of clarity and conciseness. Only one embodiment of the stand and light hanger is shown in the FIGS. 1-7 and one embodiment of the light hanger is shown in the FIGS. 9-13, however, many other embodiments are readily available by simply modifying the length and shape of the sides and poles to form different frame perimeters of squares or rectangle frames for receiving flat table tops, rectangular or square bottomed aquariums, tool boxes, or essentially anything having a four sided bottom, and having a light hanger with different proportional height or number of cross-wise equipment/light hanger poles. The depth of the stand's frame may be increased or decreased without changing the inventive features for applications requiring a deeper inset of the item to be supported. Other applications for the stand include moving dolly's or mobile display stands commonly used at conventions or marketing shows. The compact storage and easy assembly/disassembly creates versatility in functional use, while the rigid interlocking strength and wheeled mobility creates almost limitless relevance as an appliance in the home, garage, garden, or convention center.

DETAILED DESCRIPTION OF THE FIGURES

In the following discussion that addresses one embodiment of the present invention, reference is made to the accompanying figures that form a part hereof, and in which is shown by way of illustration, one specific embodiment in which the invention may be practiced. It is to be understood that other embodiments may be realized and utilized with changes made without departing from the scope of the present invention. Various inventive features are described below that can each be used independently of one another or in combination with other features.

Figure 1:
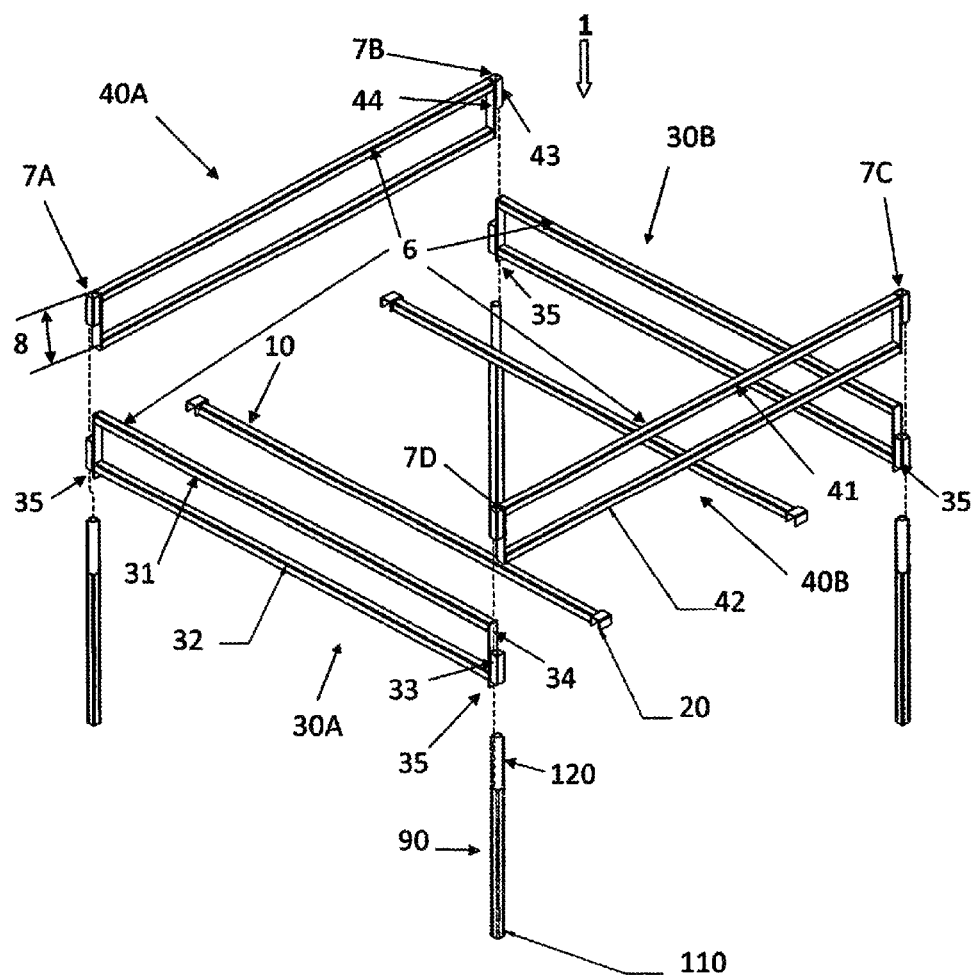
FIG. 1 is a perspective view of one embodiment of the modular tray stand as disassembled in an exploded view.

FIG. 1 shows a perspective view of one embodiment of the modular tray stand as disassembled in an exploded view. The preferred embodiment is constructed primarily of square tubing, but could be constructed from sheet metal, round tubing, cast aluminum or injection molded in plastic and depending on the application, would benefit from combinations of the above materials in the construction of the stand.

The frame perimeter 6 is defined by the top surfaces of the first base frame 30A, second base frame 30B, a first side frame 40A, and second side frame 40B. The frame perimeter 6 is the surface on or in which the supported item may rest. For the application as a plant tray stand, the plant tray would insert within the frame perimeter 6, and rest upon the top of the frame perimeter 6. For heavier support applications, cross supports 10 are added to increase rigidity to the stand 1, while also providing additional support under the item to be supported, in this embodiment the propagation tray, to prevent distortion or unlevel support. The frame perimeter 6 may be of any four sided shape having any desired length and width matching the requirements of the item to be supported. The depth 8 of the stand is also adaptable to accommodate the desired item to be supported.

In FIG. 1, the frame perimeter 6 is defined and described in clockwise order by a first base frame 30A, a first side frame 40A, a second base frame 30B and a second side frame 40B. At each corner 7A-D, a leg 90 extends down towards the ground where a wheel 100 maybe be conveniently engaged for the purposes of making the stand 1 mobile.

Figure 3:
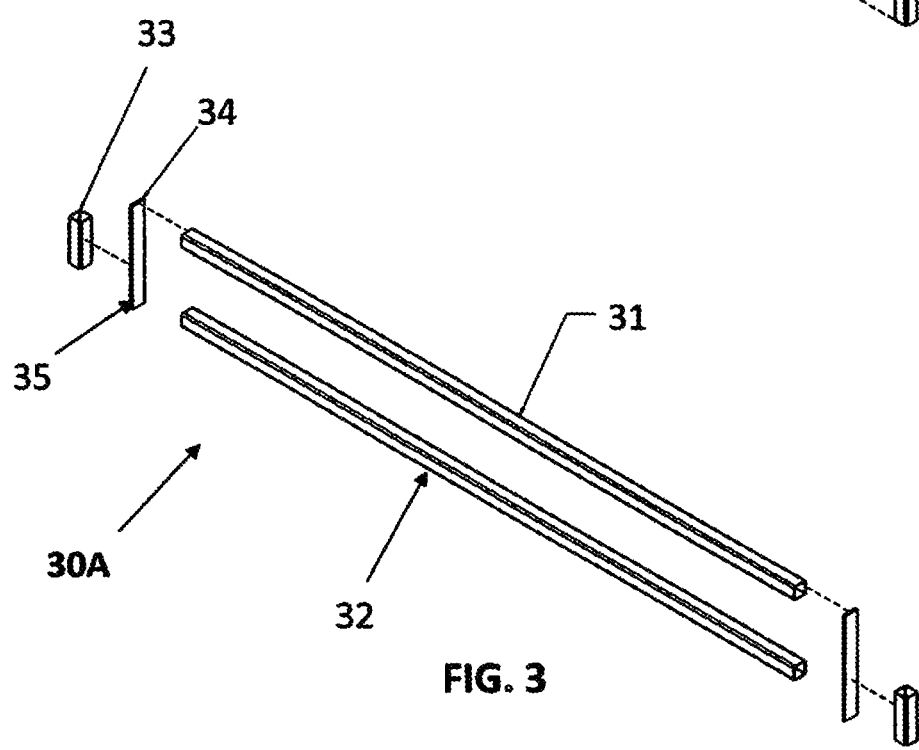
FIG. 3 is a perspective view of the base frame shown of FIG. 1.
Figure 4:
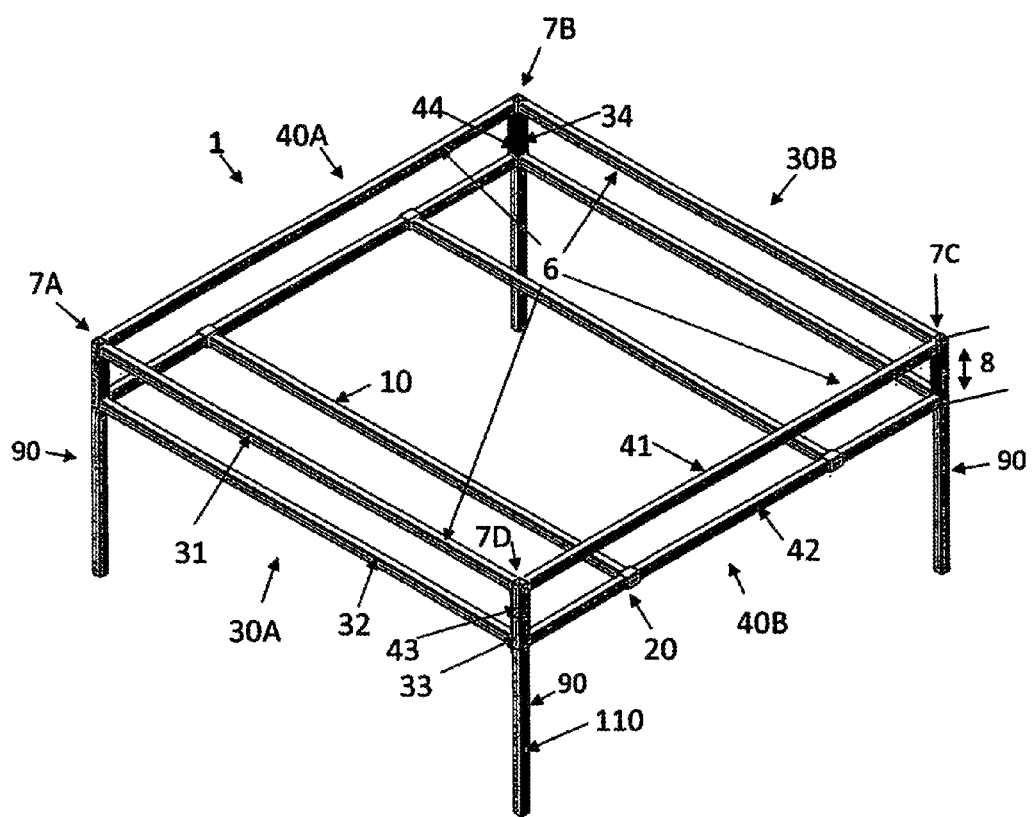
FIG. 4 is a perspective view of the assembled embodiment shown in FIG. 1 as exploded.

As shown in FIGS. 1, 3, and 4, the first base frame 30A and second base frames 30B are identical in construction, thereby making for economical manufacture. For the manufacture of the preferred embodiment, the base top tube 31 and base bottom tubes 32 are constructed of square metal tubing cut at the same length matching the corresponding frame perimeter 6 shape and size. The base top tube 31 and base bottom tube 32 are located parallel to one another, at a distance between each matching the desired depth 8 of the stand 1. A base flat plate 34 is welded onto each of the ends of the base top tube 31 and base bottom tube 32 such that a tab 35 extends past the base bottom tube 32 at both of the bottom tube's 32 ends. For the preferred embodiments shown, the base receiver 33 is constructed from square tubing, and in length matching half the length of the flat plate 34 not including the tab 35. The base receiver 33 is welded to each base flat plate 34 as shown.

Figure 2:
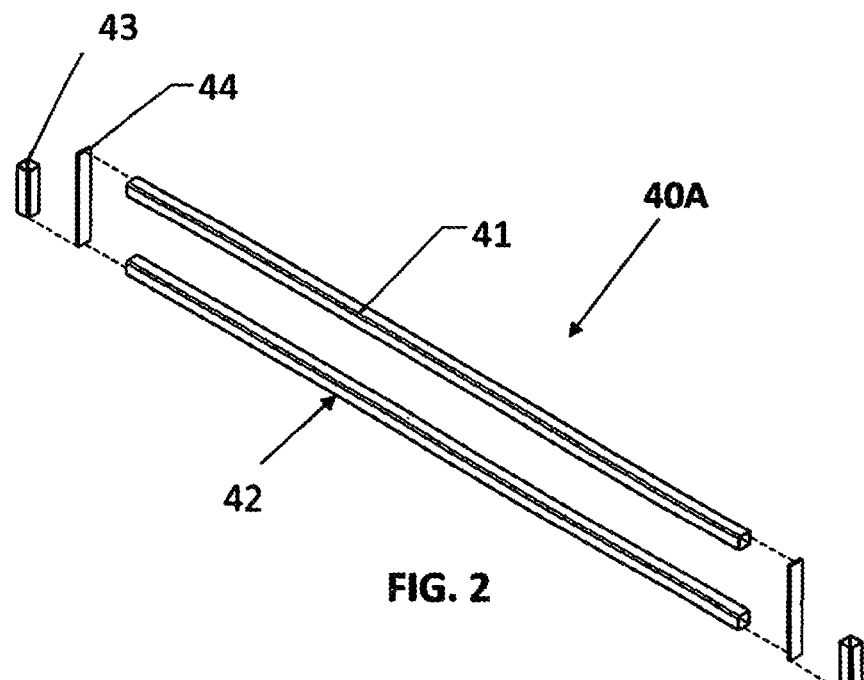
FIG. 2 is a perspective view of the side frame shown of FIG. 1.

As shown in FIGS. 1, 2, and 4, the first side frame 40A and second side frame 40B are identical, and constructed in the same manner as the first base frame 30A and second base frame 30B with the only difference being the side flat plate 44 being shorter as no tab extends past the side top tube 41 or side bottom tube 42.

In FIGS. 1, 2, 3, and 4, the preferred embodiment benefits from the side receiver 43 being of the same length as the base receiver 33, which allows for easier and more economical manufacture as all of the receivers are of the same construction.

Figure 8:
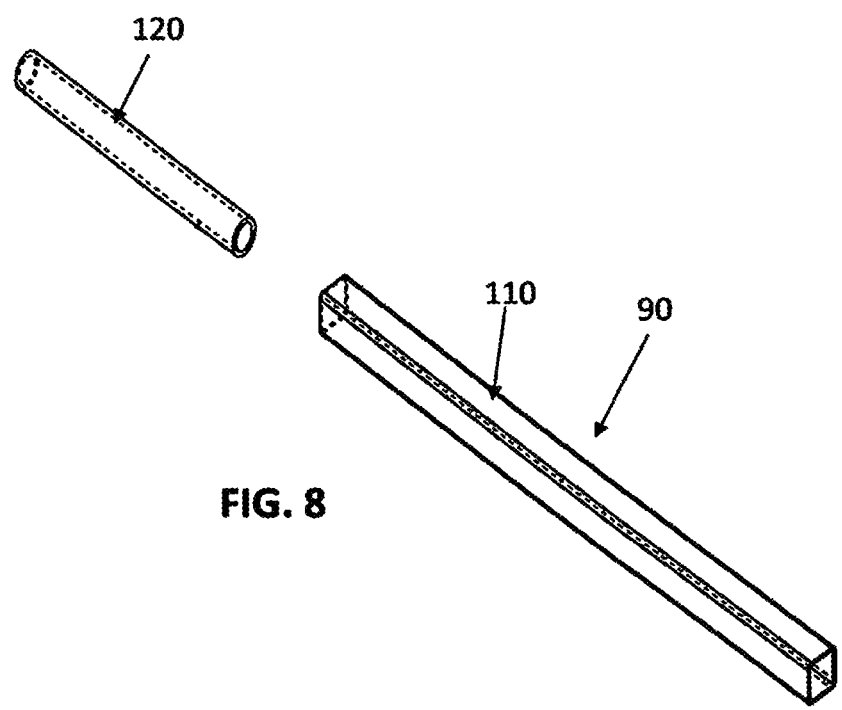
FIG. 8 is a perspective view of the leg shown in FIGS. 1 and 4 pre-fabrication.

As shown in FIGS. 1, 4, and 8, the four legs 90 have at least one flat side 110 and a dowel 120 on one end. For mobile applications a wheel 100 is engaged at the opposing leg 90 end from the dowel 120. The dowel 120 is of sufficient size to fittingly insert within the base receivers 33 and side receivers 43. As shown in the preferred embodiment, the dowel 120 is constructed of round tubing that is just small enough to fit within the base receivers 33 and side receivers 43. Tubing was used in the preferred embodiment to keep the overall weight down, however, the dowel 120 may be of solid rod material, or schedule 40 pipe, all depending on the application.

As shown assembled in FIG. 1, the dowel 120 does not extend out of the side receiver 43, however, in other embodiments and applications the dowel 120 is of greater length and extends out of the receiver 43 providing mounting structure to facilitate the addition of other items such as light racks, plant training web, irrigation systems, covers, and other added features to increase the versatility of the stand.

FIG. 3 shows a close up of the presented embodiment for the first and second base frames 30A and 30B with the base receiver 33, base flat plate 34 and tab 35. A base top tube 31 and base bottom tube 32 fixate to the flat plate 34 by weld as shown, but any other fixation means is sufficient.

FIG. 2 shows a close up of the presented embodiment for the first and second side frames 40A and 40B, with the side receivers 43, side flat plates 44 and no tab. A side top tube 41 and a side bottom tube 42 fixate to the flat plate 44 by weld as shown, but any other fixation means is sufficient.

Figure 5:
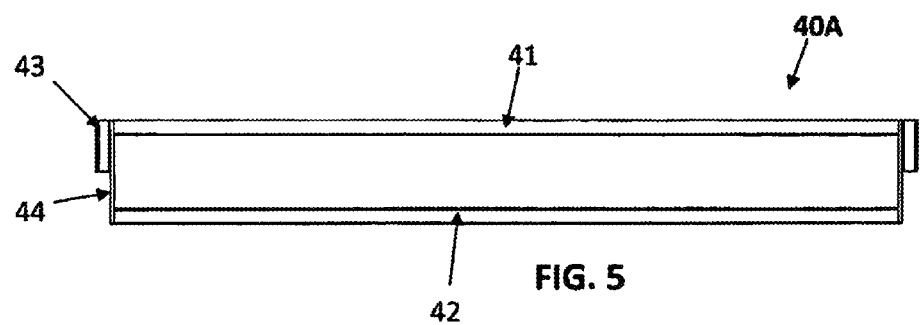
FIG. 5 is a side view of the side frame shown of FIGS. 1, 2 and 4.

FIGS. 2 and 3 show exploded views of exemplary side 40A and base 30A frames, where the side receivers 43 and base receivers 33 are shown mounted with the same orientation on either the upper portion or lower portion of the side flat plates 44 or base flat plates 34, respectively. For example, the side receivers 43 are shown in FIG. 2 as being mounted on the lower portion of the side flat plates 44 nearest the side bottom tube 42, in one embodiment, but may be mounted on the upper portion of the side flat plates 44 nearest the side top tube 41 as shown in FIGS. 1 and 5. Similarly, the base receivers 33 may be mounted on the lower portion of the base flat plate 34 as shown in FIG. 3, or, in other embodiments, mounted on the upper portion of the base flat plate 34 (not shown).

In one embodiment (not shown), side receiver 43 may be mounted on the lower portion of the side flat plate 44 on one end of the side frame 40A, with the side receiver 43 on the other end of the side frame 40A mounted on the upper portion of the side flat plate 44, and base receiver 33 may be mounted on the lower portion of the base flat plate 34 on one end of the base frame 30A, with the base receiver 34 on the other end of base frame 30A mounted on the upper portion of the base flat plate 34. In one embodiment (not shown), both side and base frames are constructing as above, with one receiver mounted nearest the top tube and the other receiver mounted nearest the bottom tube, and the combination of two side frames and two base frames may be assembled to form a tray stand having an overall appearance as that shown in FIG. 4.

In yet another alternative embodiment (not shown), both side frames and base frames may be made to be identical, such as for example substantially similar to the base frame 30A shown in FIG. 3 but having a receiver 33 at one end mounted on a lower portion of the flate plate 34 and the other receiver 33 mounted on the opposite end of the frame on an upper portion of the opposite end's flate plate 34. With four identically constructed frames 30A, according to one embodiment, a tray stand may be assembled having the overall appearance as that shown in FIG. 4, the resulting tray stand requiring even fewer unique components than the tray stand 1 shown in FIG. 1.

Figure 6:
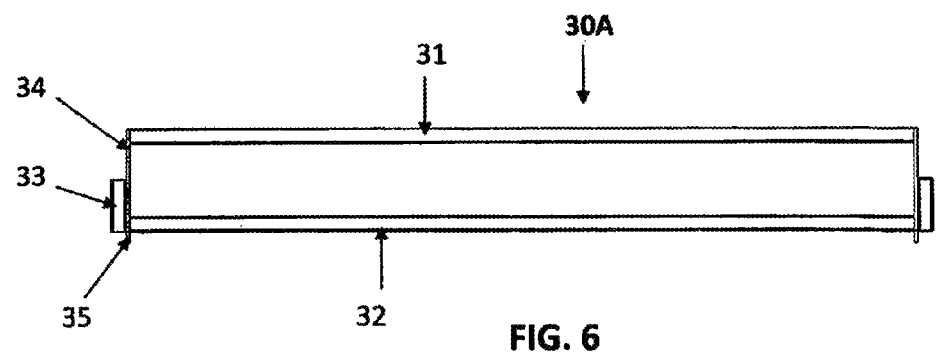
FIG. 6 is a side view of the base frame shown of FIGS. 1, 3 and 4.

In various embodiments, the tab 35 shown in FIG. 3 may comprise flat plate 34 material extending downward (for rotational locking contact with leg 90) below the lower most surface of bottom tube 32 (as shown, for example, in FIG. 6), or the tab 35 may comprise a portion of flat plate 34 extending downward (for rotational locking contact with leg 90) below the lower most edge of receiver 33 but not necessarily extending below the lower most surface of bottom tube 32.

FIG. 4 shows an assembled tray stand 1 comprised of the components shown in FIG. 1, in preferred embodiments. The overall shape of the frame perimeter 6 is preferably rectangular or square. In embodiments not shown, the tray stand may comprise an extra pair of corners such as 7B and 7C interconnecting the base frame 30B with an additional pair of side frames 40A and 40B, the resulting tray stand having six legs 90, base frames 30A and 30B, and two side frames 40A and two side frames 40B. Similarly, in embodiments not shown, the tray stand may comprise an extra pair of corners such as 7C and 7D interconnecting the side frame 40B with an additional pair of base frames 30A and 30B, the resulting tray stand having six legs 90, side frames 40 and 40B, and two base frames 30A and two base frames 30B. Likewise, in similar fashion as described above for the addition of either another pair of side frames (plus two additional legs) or another pair of base frames (plus two additional legs), additional pairs of either side or base frames (and corresponding legs) may be added, the resulting tray stand comprising the basic components shown in FIGS. 1 and 4 but having two extra legs, four extra legs, and so on.

FIG. 8 shows a close up exploded view of the leg 90 having the flat side 110, and dowel 120. The leg 90 is able to accept wheel, as wheels are not desirable in all applications, so having the wheels easily detach is desired, and many wheel attachment and detachment methods are well known in the art and therefore not disclosed herein. In preferred embodiments, a lower portion of the leg 90 comprises at least one flat surface 110 for rotational locking contact and engagement with a lower portion of flat plate 34 or tab 35, depending upon the particular embodiment regarding mounting of the receiver 33 to the flat plate 34. In one embodiment, the lower portion of leg 90 comprises square or rectangular tubing. In preferred embodiments, an upper portion of the leg 90 comprises a dowel 120 which inerttingly and fixatedly fits within the lower portion of the leg 90 so that insertion of the dowel 120 portion into the receivers (such as receivers 33 and 43) allows longitudinal insertion of the dowel 120 into each receiver with the lower portion of the leg 90 unable to insertingly fit into at least one of the two receivers that comprise an interlocking corner joint of the tray stand. In one embodiment, the dowel 120 intertingly fits within the receiver 33, and the lower portion 110 is unable to inertingly fit into the receiver 33, the lower portion of the leg 90 thereby providing a stop and weight bearing surfaces preventing further longitudinally downward travel of the receivers along the leg 90.

Figure 14:
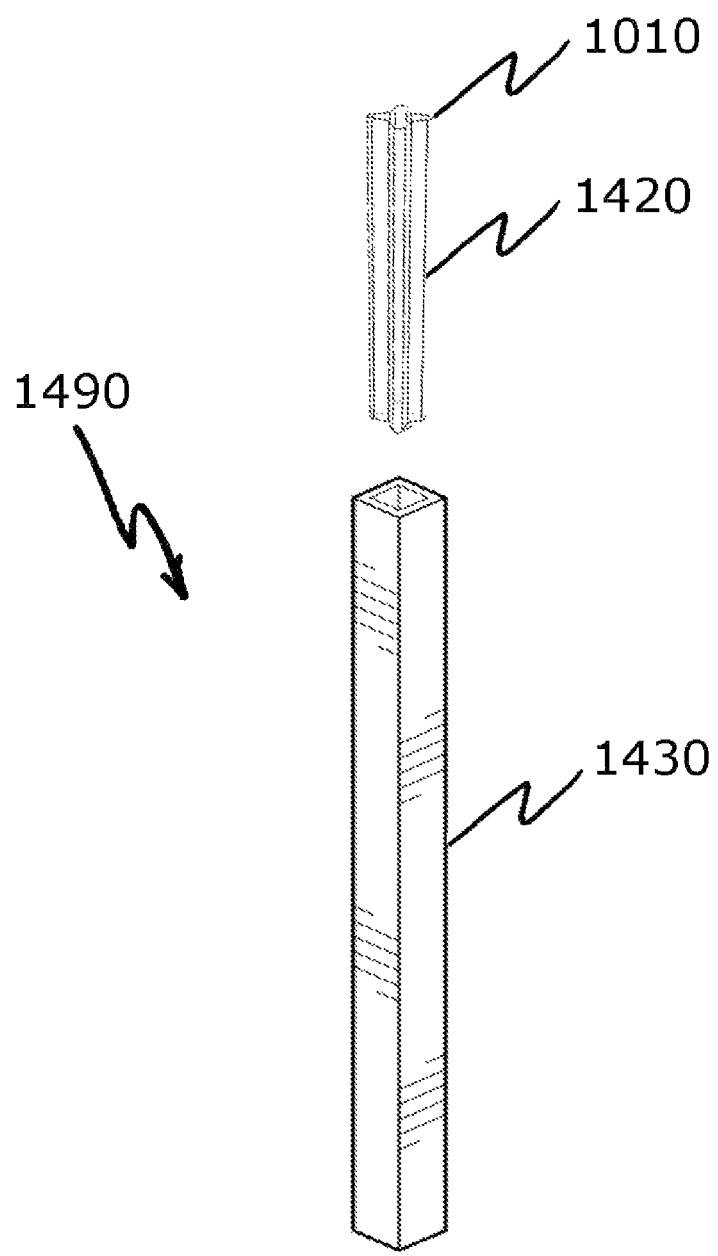
FIG. 14 is a perspective view of a tray stand leg as disassembled in an exploded view, according to one embodiment.

In preferred embodiments, the dowel 120 comprises round material or round tube stock as shown in FIG. 8 that is fixatingly inserted (such as instered and welded or glued in place) into the lower portion 110. The dowel 120 is preferably sized to insertingly fit within receivers 33 and 43. In alternate embodiments, the dowel 120 may be differently shaped yet still insertingly fit (for easy hand assembly and disassembly of a tray stand corner) into receivers 33 and 43. For example, in one embodiment, as shown in FIG. 14, a tray stand leg 1490 may comprise a dowel 1420 having a diamond shape 1010. The diamond shape 1010 may be formed, for example, by using press brake folded square stock tubing. The dowel 1420 having a diamond shape cross section is fixatingly inserted into the lower leg portion 1430, with the lower leg portion 1430 having at least one flat surface for rotational locking engagement with a lower portion of a flat plate 34 or tab 35. In various embodiments, the tray stand in FIGS. 1 and 4 may utilize legs 1490 in place of legs 90.

Figure 7:
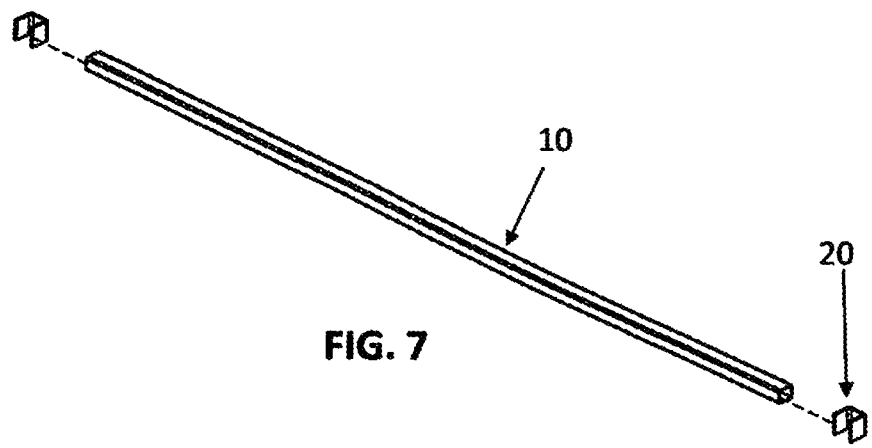
FIG. 7 is a perspective view of the cross support shown of FIGS. 1 and 4.

FIG. 7 shows a close up view of the cross supports 10 and U sleeve 20. These cross supports 10 may be constructed with adjustability to enable different depths of plant trays to be used as discussed earlier. Ideally, the U sleeve 20 is of shape and size such that the base top tube 31, base bottom tube 32, side top tube 41 or side bottom tube 42 fittingly insert within the crux of the "U" shape, thereby allowing fixation, without fasteners, screws, or bolts. For applications to support great mass, or in the indoor gardener setting, requiring significant water and growing media in the tray or for deeper trays that simply hold more weight, cross supports 10 having slip over U sleeve 20 provide under tray support, while increasing strength, stability, and rigidity to the entire tray stand as shown in FIG. 1 assembled.

One possible method of assembling the stand by a solo assembly involves a first step, which is to align the dowel 120 of each leg 90 shown in FIG. 8, with the base receivers 33 shown in FIG. 3, and insert the dowel 120 first through the tab 35 end of the base receivers 33 one at a time until all dowels 120 are fully and fittingly inserted within the base receivers 33. Each dowel 120 should protrude out the other side of each base receiver 33 of each tab 35 parallels in mating contact to a flat side 110 of each leg.

The second step in a one person assembly is to locate the now inserted legs 90 and the first and second base frames 30A and 30B parallel to one another, and spaced apart at a distance approximately matching the length of the first side frame 40A and second side frame 40B.

The third and final step in a one person assembly is to position the first side frame 40A such that the exposed side flat plate 44 end of the side receivers 43 are over and aligned with the dowels 120 protruding from the first base frame 30A and the corresponding end of second base frame 30B such that when the first side frame 40A is brought down the exposed flat plate 44 comes to rest against one side of the corresponding base receiver 33, and the dowels 120 fittingly slide within the corresponding side receivers 43 such that corners 7A and 7B are defined and three sides of the perimeter frame 6 is defined as shown in FIG. 1. The second side frame 40B is slid over the remaining protruding dowels 120 in the same manner as the first side frame 40A, thereby completing the four sides and frame perimeter 6 and defining corners 7C and 7D as shown assembled in FIG. 4. Disassembly is the same except in reverse order.

Another method of assembly involves assembling the stand one corner 7A-D at a time: First by inserting one end of the first leg 90 through one end of the first base frame 30A and then inserting the same end of the first leg 90 through one end of the first side frame 40A, locating the other end of the first leg towards the ground, thereby forming a first corner 7A of the stand 1; Second, by inserting one end of the second leg 90 through one end of the second base frame 30B, and then inserting the same end of the second leg 90 through the other end of the first side frame 40A, locating the other end of the second leg 90 towards the ground thereby forming a second corner 7B; Third, by inserting one end of the third leg 90 through the other end of the first base frame 30A, and then inserting the same end of the third leg through one end of the second side frame 40B, locating the other end of the third leg towards the ground thereby forming the third corner 7C; and Fourth, inserting one end of the fourth leg 90 through the other end of the second base frame 30B, and then inserting the same end of the fourth leg 90 through the other end of the second side frame 40B, locating the other end of the fourth leg towards the ground thereby forming the fourth corner 7D. When all four legs have been inserted as per steps above, the stand 1 will ready to receive plant tray, table top, fish tank, or any other square or rectangular base object.

Once assembled as shown in the preferred embodiment in FIGS. 1-8, each base flat plate 34 and side flat plate 44 parallels in mating contact with a corresponding side of a base receiver 33 and side receiver 43, whereby the first and second base frames 30A and 30B rigidly interlock with the first and second side frames 40A and 40B having the dowel 120 maintain the interlocking alignment and rigidly engage the corresponding leg 90 at the corresponding corners 7A-D. The weight of the components of the stand 1 provides the constant force to maintain the interlock at the corners locking the frame together once assembled as shown in FIG. 4. As weight is added to the frame perimeter, or at optional cross supports 10, the components deflect and distort minimally thereby tightening the interlocking effect at the corners 7A-D, and increasing the strength and rigidity of the stand 1. In short, the more weight added, the stronger the interlock, and more stable the stand becomes. Remove the weight, and the stand 1 easily knocks down into it's modular components for quick and convenient storage or transport.

Figure 9:
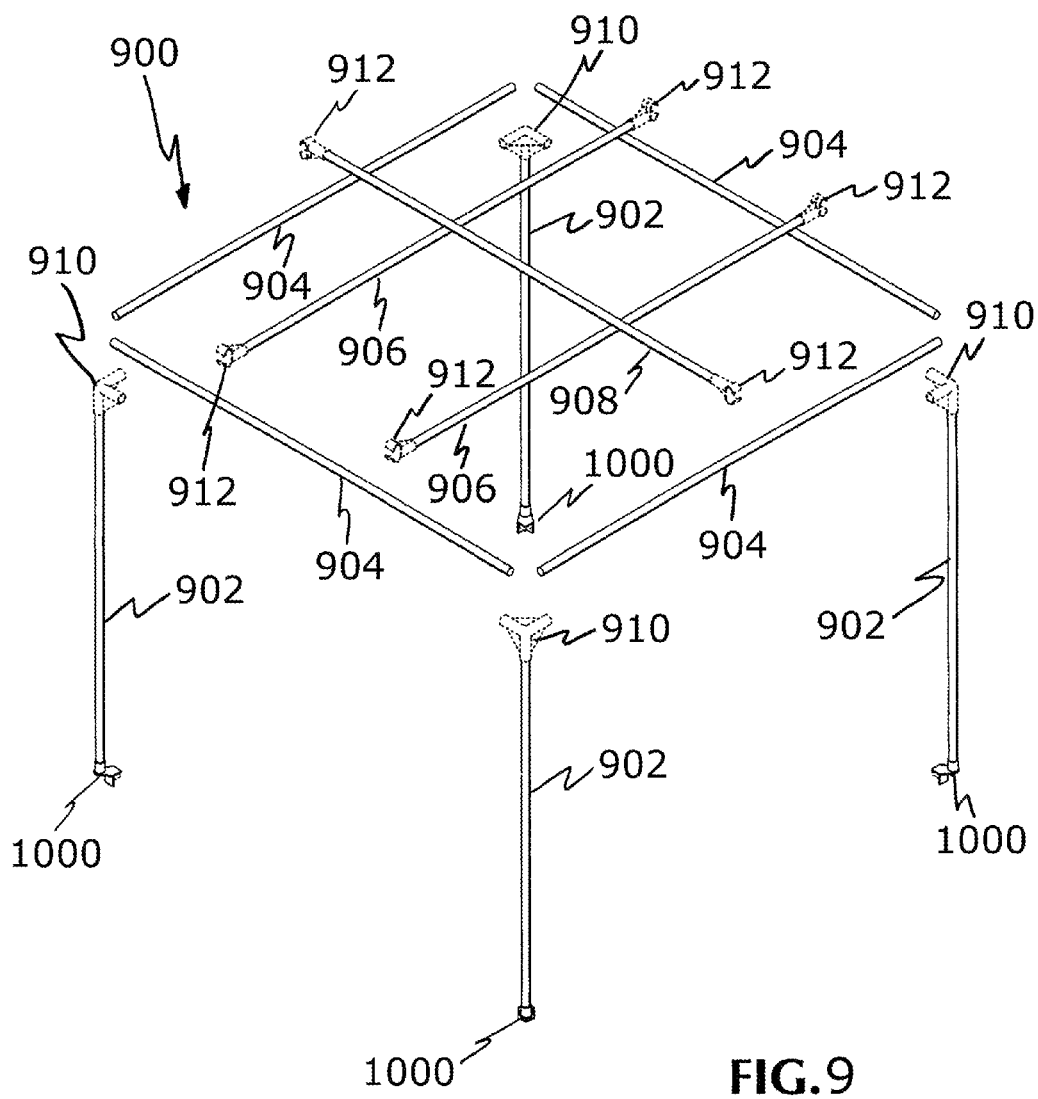
FIG. 9 is a perspective view of one embodiment of a modular portable light hanger as disassembled in an exploded view.
Figure 12:
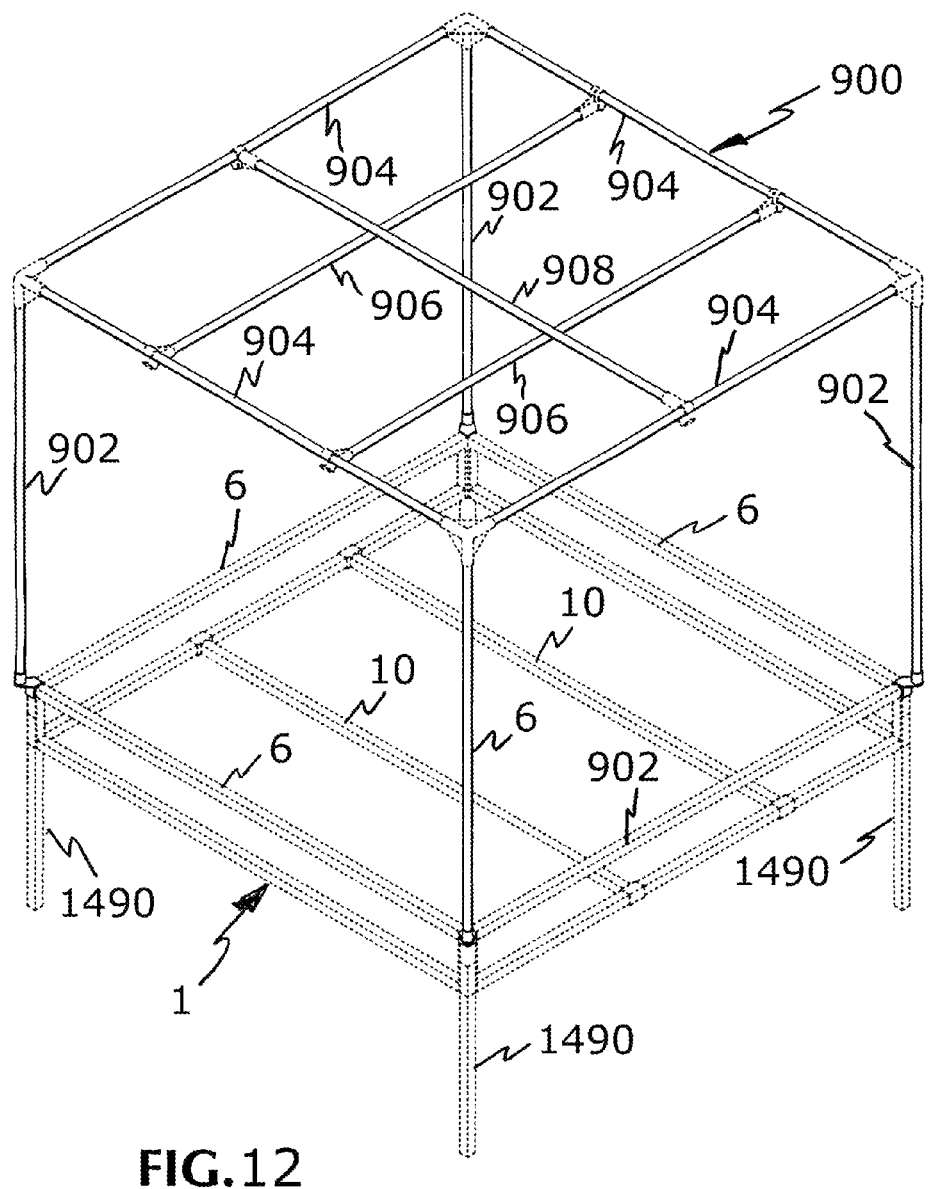
FIG. 12 is a perspective view of a modular portable light hanger as assembled and combined with a modular tray stand, according to various embodiments.

FIG. 9 is a perspective view of one embodiment of a modular portable light hanger 900 as disassembled in an exploded view. In preferred embodiments, the light hanger 900 comprises four corner (or wall) poles 902, interconnected with four (ceiling) perimeter poles 904 using press-fit type 3-way corner connectors 910, at least one equipment/light hanger pole such as the equipment/light hanger poles 906 and equipment/light hanger pole 908 having equipment/light hanger connectors 912 at each end for tooless interconnection with perimeter poles 904 (as shown), and four hanger-to-tray stand corner transition adapters 1000 for toolessly interconnecting each of the corner poles 902 with a corner joint of the tray stand. Each of the poles 902, 904, 906, 908 preferably comprise tubular metal, but may comprise other materials and shapes, such as square or rectangular material. And each of the 3-way connectors 910 and hanger connectors 912 preferably comprise plastic connectors substantially as shown and sized to snugly and securely receive and interconnect the poles 902, 904, 906, and 908, as shown in FIG. 12. In preferred embodiments, the light hanger 900 comprises eleven poles, each substantially identical in diameter and length and interchangeable with one another so that a pole used as a corner pole 902 may be repurposed as a perimeter pole 904 or hanger pole 906 or 908. Preferably the corner connectors 910 and hanger pole end connectors 912 fit over the ends of any pole. In other embodiments, not shown, poles of varying lengths may be used. For example, the four corner poles 902 may be of different length than the perimeter poles 904 and hanger poles 906 and 908. And for example, the perimeter poles 904 (and corresponding hanger poles 906 and 908) may be of different lengths from one another if the base and side frames comprising the perimeter 6 of the tray stand 1 form a rectangle instead of a square.

In preferred embodiments, each of the poles 902, 904, 906, and 908 comprising the light hanger 900 comprise pole members having the same cross-sectional dimensions. Preferably, each of the corner and perimeter poles share a common cross-sectional diameter.

Figure 10:
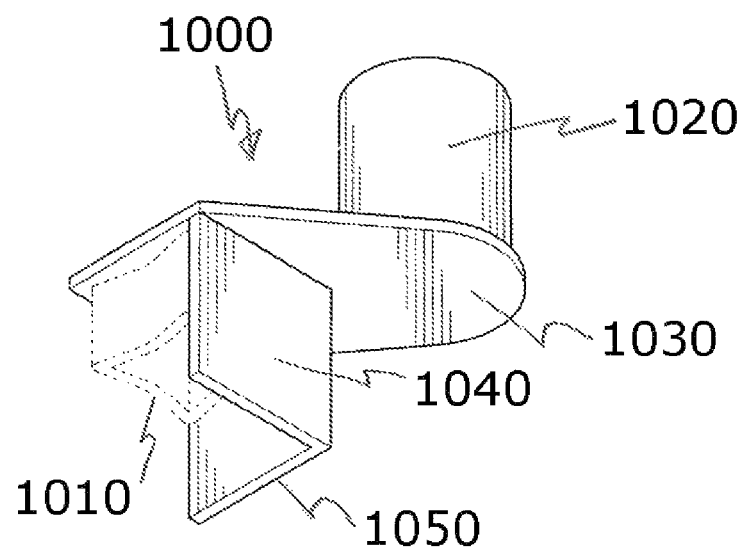
FIG. 10 is a perspective view of a hanger-to-tray stand corner transition, in one embodiment.

FIG. 10 is a perspective view of a hanger-to-tray stand corner transition (or adapter) 1000, in one embodiment. The hanger-to-tray stand adapter 1000 preferably comprises a unitary component having a corner (wall) pole engaging receiver 1020 sized to receive an end of a corner pole 902. The corner pole engaging receiver 1020 is fixably mounted to a corner transition overhang portion 1030, upon which first 1040 and second 1050 corner transition tray stand outer engagement surfaces extend in a downward direction, parallel to and engaging with a tray stand leg 90, opposite to the direction that the corner pole engaging receiver 1020 extends, the corner pole engaging receiver 1020 extending upward and parallel with a corresponding inserted corner pole 902. Also preferably extending parallel to the first 1040 and second 1050 corner transition tray stand outer engagement surfaces, is a diamond shaped dowel 1010, sized and shaped to insertingly fixate within an open top of a tray stand receiver such as side frame receiver 43.

Figure 11:
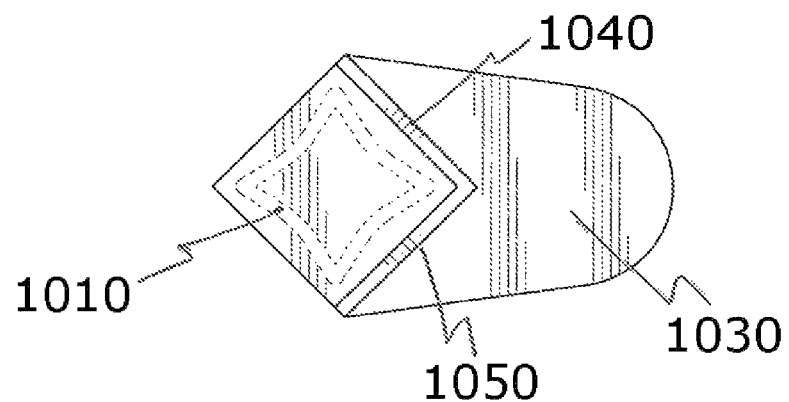
FIG. 11 is a bottom view of a hanger-to-tray stand corner transition, in one embodiment.

FIG. 11 is a bottom view of a hanger-to-tray stand corner transition 1000, in one embodiment. The diamond shaped dowel 1010 is preferably sized and oriented with respect to the first corner transition tray stand outer engagement surface 1040 and the second corner transition tray stand outer engagement surface 1050 so as to provide a space at least as large as the material thickness of the tray stand receiver, such as side receiver 43. The diamond shaped dowel 1010 is preferably sized so that each point (or corner) of its star/diamond cross sectional shape snugly fits within an inside corner of square tube stock comprising each tray stand receiver 43.

FIG. 12 is a perspective view of a modular portable light hanger 900 as assembled and combined with a modular tray stand 1, according to various embodiments. The light hanger components shown in FIG. 9 are most preferably assembled (and disassembled) by hand and without any tools or fasteners or hardware, and are likewise preferably assembled (and disassembled) by hand and without any tools or hardware to a tray stand 1 with four adapters 1000 providing the interconnection between the light hanger 900 and the tray stand 1.

Figure 13:
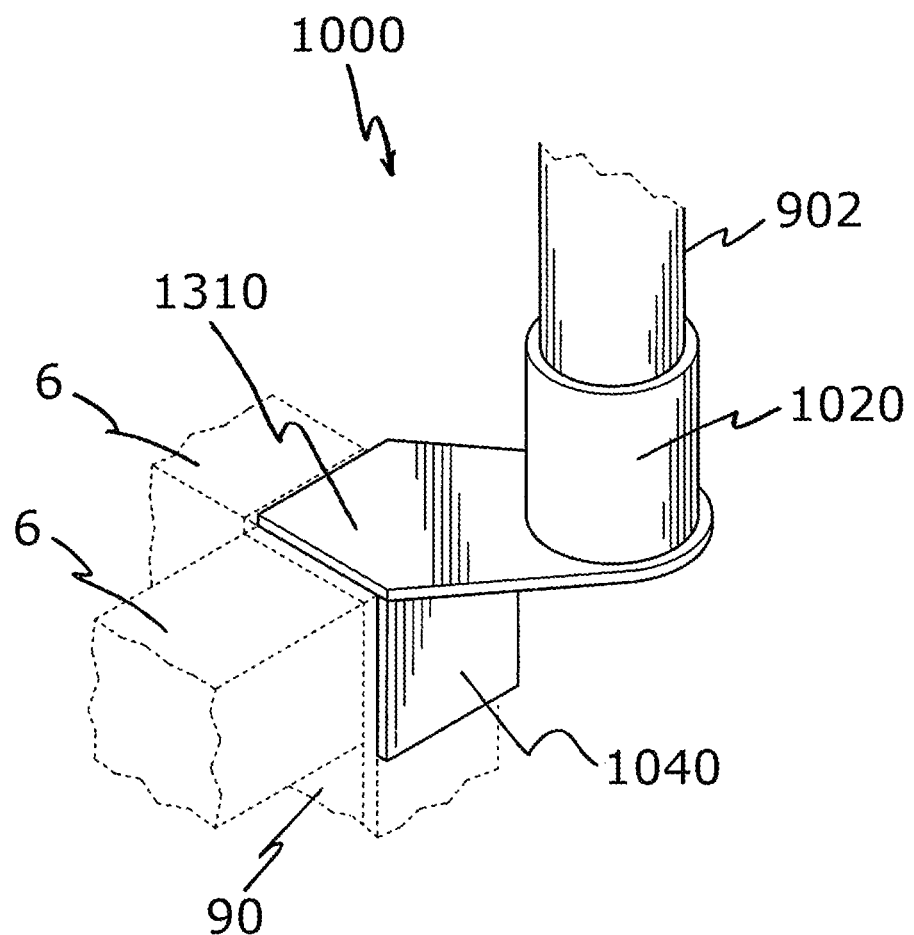
FIG. 13 is a perspective partial view of a hanger-to-tray stand corner transition as combined with a light hanger corner pole and perimeter members and leg of a tray stand, according to various embodiments.

FIG. 13 is a perspective partial view of a hanger-to-tray stand corner transition 1000 as combined with a light hanger corner pole 902 and perimeter members 6 and leg 90 of a tray stand 1, according to various embodiments. As shown in FIG. 13, the transition (adapter) 1000 comprises a substantially flat overhang member upon which a corner pole engaging receiver 1020 extends upward and from which corner transition tray stand outer engagement surfaces 1040 and 1050 and corner transition dowel 1010 extend downward. The adapter 1000 preferably comprises overhang material 1310 that is substantially coplanar (within a material thickness of the overhang material) to the upper most surfaces of (and plane formed by) the tray stand perimeter 6. In preferred embodiments, the adapter 1000 comprises a receiver 1020 sized to receive a round tube light hanger corner pole 902, flat overhang material 1320 whereby the receiver 1020 is oriented so as not to cover the perimeter 6 or corner of the tray stand 1, and tray stand receiver engaging material such as the engaging surfaces 1040 and 1050 and dowel 1010. The receiver engaging material 1040 and 1050 may comprise surfaces that extend further downward for contact engagement with larger surface areas of the tray stand receiver than shown. The flat overhang material 1310 may, in some embodiments, extend across the top surface of tray stand perimeter 6 more than shown. In most preferred embodiments, the flat overhang material 1310 of the transition/adapter 1000 orients the receiver 1020 so that the edges of a plant growing tray may overlap the perimeter 6 of the tray stand and allow enough space for the transition/adapter 1000 to receive and interconnect with corner poles 902 for hand/tooless assembly and disassembly of a light hanger 900 in combination with a tray stand, substantially as shown in FIG. 12.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A modular portable light hanger for use with a modular portable tray stand, comprising:
   (a) four corner poles;
   (b) four perimeter poles interconnectable with the top ends of said corner poles by hand and without the need for tools or hardware;
   (c) at least one equipment bearing pole extending between two of said four perimeter poles, the equipment bearing pole interconnectable with said perimeter poles by hand and without the need for tools or hardware;
   (d) four corner adapters, each having a dowel directed downward and insertable into an open end of a tubular receiver of a tray stand corner joint, at least one surface extending parallel to said dowel for engagement with an exterior surface of said tubular receiver, and a corner pole receiver directed opposite said dowel and sized to receive insertion of a lower end of one of said corner poles, said corner adapters interconnectable with said corner poles by hand and without the need for tools or hardware.

2. The light hanger of claim 1 wherein said corner poles, perimeter poles, and at least one equipment bearing pole comprise round tubular metal poles of the same diameter.

3. The light hanger of claim 1 wherein said poles and adapters are repeatably interconnectable for repeatable assembly and disassembly by hand and without the need for tools or hardware.

4. The light hanger of claim 1 wherein said dowel has a diamond shaped cross section and is sized to snugly and rotatingly securely insert into square tubular material used for said tubular receiver of said tray stand corner joint.

5. The light hanger of claim 1 further comprising a tray stand having four legs and four sides, said four legs and four sides being interconnectable for repeatable assembly and disassembly by hand and without the need for tools or hardware.

\* \* \* \* \*